United States Patent [19]

Martin

[11] 4,221,648

[45] Sep. 9, 1980

[54] MEDIA REGENERATION IN ELECTROFILTRATION

[75] Inventor: Robert B. Martin, Spring, Tex.

[73] Assignee: Petrolite Corporation, St. Louis, Mo.

[21] Appl. No.: 924,464

[22] Filed: Jul. 14, 1978

[51] Int. Cl.[2] .......................... B03C 5/00; B08B 3/04; B01D 23/24

[52] U.S. Cl. ........................................ 204/186; 134/3; 210/748

[58] Field of Search ............................... 204/186-191, 204/131, 141.5; 210/32, 35, 80, 82; 134/3, 25 R, 111

[56] References Cited

U.S. PATENT DOCUMENTS

| | | | |
|---|---|---|---|
| 3,649,489 | 3/1972 | Dillenberg | 204/146 |
| 3,799,855 | 3/1974 | Franse | 204/188 |
| 3,799,856 | 3/1974 | Franse | 204/188 |
| 3,799,857 | 3/1974 | Franse | 204/188 |
| 3,928,158 | 12/1975 | Fritsche | 204/188 |
| 4,040,926 | 8/1977 | Oberton | 204/186 |

*Primary Examiner*—T. M. Tufariello
*Attorney, Agent, or Firm*—Sidney B. Ring; Hyman F. Glass

[57] ABSTRACT

The media employed in the electrofiltration of organic fluids can be regenerated by washing with inorganic acids such as phosphoric, nitric, etc., acids. It is particularly effective in systems employing metal catalysts, for example nickel, etc., in hydrogenation systems such as in hydrogenated vegetable oils, etc.

19 Claims, No Drawings

MEDIA REGENERATION IN ELECTROFILTRATION

In certain recent applications and patents there have been disclosed and claimed electrofiltration processes for purifying organic liquids. For example, U.S. Pat. No. 4,040,926, which is incorporated into this patent application as if part hereof, claims the following:

"1. An electrofiltration process for removing hydrogenation catalyst and other undissolved solids from a stream of edible oil which has been subjected to catalytic hydrogenation, said process comprising:

a. providing the stream of so hydrogenated edible oil at a sufficient temperature that organic solids such as stearine are in solution and cannot plug an electrofilter bed adapted to remove the undissolved solids carried therein;

b. passing said stream of oil through a chemically inert bed having multitudinous flow channels between rigid masses of a solid material having a dielectric constant not in excess of about 7;

c. establishing a d.c. electrical field within said bed having an intensity sufficient for removing the undissolved solids from said stream of oil by electrically induced adhesion of the solids in said bed material;

d. removing the purified oil stream with reduced undissolved solids content from said bed; and e. cleaning at selected intervals at least a portion of said material of adhering solids by interruption of said electrical field, passing a cleaning fluid to remove adhering solids from said material and removing the fluid with the removed solids from said material."

I have now found that although washing the media with water or organic solvent is effective in removing adhering solids from the media, the effectiveness of the media in the electrofiltration process tends to be degraded or reduced with repeated usage. It is believed that this degradation is caused by the presence of nickel on the surface of the media that cannot be removed by washing with water or organic solvent.

I have now discovered that this reduction in effectiveness of the electrofiltration system can be corrected by washing the media employed with acids such as inorganic acids, for example phosphoric, nitric, etc., acids.

Any suitable acid can be employed including the following. In general inorganic acids such as the mineral acids are preferred. In practice, the concentration of 1% to 96% at a rate of 1 to 20 lbs. of acid per cu. ft. of media or, for example, from 70% to 86% at a rate of 5 pounds of acid per cubic foot of media, is employed.

The media and their performance was further described in U.S. Pat. No. 4,040,926 as follows:

In Col. 11, lines 4–28—

"The particles 76 should be chemically inert and not contaminate the edible oil. The particles 76 should have a relatively discontinuous surface configuration in contrast to a highly polished smooth surface such as glass bead or marble. In addition, the particles 76 should have a relatively high density or specific gravity and a substantial hardness compared to the solids which are to be removed. Particles selected for use in the present electrofiltration system are preferably minerals containing crystalline silicon dioxide such as flint, garnet, granite and fused quartz. These particles 76 selected from this mineral group have a hardness value of at least 7 on the Mohs scale of hardness, a specific gravity between about 2.5 and about 2.9, a dielectric constant of about 4, and a discontinuous surface configuration provided in nature. The particles 76 may range in size from about 1 to about 13 mm for good results. A crushed flint with an average (50 percentile) particle size (smallest dimension) of 2.5 mm gives excellent results. These particles in the electrofilter 37 will not contaminate the edible oil during either electrofiltration or the cleaning cycle for removing adhering solids from the bed 77. In addition, these particles provide an unexpected ease in cleaning the adhering solids from the bed 77 with a cleaning fluid."

In Col. 12, lines 7–25—

"The experimental electrofilter system was operated on this edible oil charge under precise test procedures on three types of particle media, designated as F-11, M-1, and G-1. These media were commercial Flintbrasive brand sandblasting materials which are commercially available from Clemtex Limited of Canada at Houston, Tx. More particularly, the media F-11 was a crushed flint rock with an average (50 percentile) particle size (least dimension) of 2.5 millimeters. The media M-1 was a commercial 'No. 1 marine sand' which had been screened so that all particle sizes were between 8 and 20 mesh on Tyler standard screens. The media G-1 was a river gravel (granite) which had been screened to sizes between one-fourth and one-half inch. These media are all minerals containing crystalline silicon dioxide, have specific gravities between about 2.5 and about 2.9, dielectric constants less than about 5 and usually about 4, and high dielectric strengths."

In Col. 13, lines 33–48—

"It is noted that the media F-11 gave outstanding results, and it is preferred for the purposes of the present invention. The other media, G-1 and M-1, also gave acceptable results. However, the media M-1 did not have the capacity to remove inorganic solids as do media F-11 or G-1."

Thus the media employed in the present electrofiltration process has been described in U.S. Pat. No. 4,040,926. Although it can be employed with other media, the present process is most effective when employed with media F-11 which is a crushed flint rock with an average (50 percentile) particle size (least dimension) of 2.5 millimeters.

The following examples are presented to illustrate the effectiveness of this invention.

EXAMPLE 1

(1) A 0.03 cu. ft. sample of contaminated media F-11 was placed in a pilot Electrofilter and hydrogenated soybean oil (SBO) plus 90 gm. of spent nickel catalyst was processed through the unit. An operating temperature of 200° F. did not produce the expected results in that the treated oil contained quantities of nickel as expressed by filter color discs of 6 to 8.

(2) The pilot unit was backwashed and charged with a new batch of clean SBO and allowed to recirculate at about 300° F. 40 ml. of 86% phosphoric acid was added to the recirculating SBO and the system allowed to recirculate for 45 minutes.

(3) After the removal of the phosphoric acid from the media the system was again charged with hydrogenated SBO and 90 gm. of nickel catalyst. At an operating temperature of 200° F., filter color discs of 10, which is the highest possible rating, were observed during the entire run as would be expected with new uncontaminated media.

COMMERCIAL APPLICATION SYSTEM

A commercial operation can be carried out as follows:

(1) The system can be backwashed with clean SBO to remove as much loose material as possible.

(2) SBO can then be recirculated and about 20 gallons of 86% $H_3PO_4$ added and circulated for 45 minutes.

(3) SBO from the unit and lines can be filtered by draining through leaf filters for oil recovery.

(4) Water is then added to the Electrofilter Separator vessel and washed until the acid and contaminants are removed.

(5) The water then drained from the unit and hot SBO is recirculated to a vacuum drop tank for residual water removal.

(6) The system can then be placed back in service.

The oil used in the procedure will not be degraded by the acid. After filtering the oil through a diatomaceous filter media the acid and entrained contaminants will be removed.

The present invention can also be employed to regenerate other media employed in electrofiltration. The following illustrate other media which can be regenerated by the process of this invention.

In the following patents there is described and claimed an electrofilter employing hard granular spheroidal particles.

U.S. Pat. No. 3,799,855 relates to "a process for the removal of solids from a viscous heavy hydrocarbon stream such as petroleum residium. The process includes the step of adjusting the temperature of a porous bed until the stream can flow therethrough without any significant condensation of dissolved or entrained water. The solids containing stream is passed through the porous bed which bed is formed of hard granular spheroidal particles. These particles are substantially incompressible dielectric material. An electric field is established within the porous bed having an intensity of at least 5 kilovolts per inch of DC potential. The electric field causes the removal of solids from the stream and their tenacious adhesion to the particles. The stream with reduced solids contents is removed from the porous bed to a subsequent utilization. The particles are periodically cleaned of the accumulated solids to restore the solids-removal efficiency of the porous bed."

U.S. Pat. No. 3,799,856 relates to "a process for the waterless desalting of a stream of salt-contaminated hydrocarbon such as crude oil and its products. The salt-carrying stream is provided (e.g., electric dehydration) with a dispersed water content of less than 1% by volume. The temperature of the stream is adjusted until all of the water is in solution within the hydrocarbon phase and only salt solids are dispersed within the stream. The stream is passed, with all of the water being held in solution, through a porous bed formed of hard granular spheroidal particles. The particles are substantially uniform in size and of a rigid and substantially incompressible dielectric material. An electric field is established within the bed having an intensity of at least 5 kilovolts per inch of DC potential. The salt solids are removed from the stream by their tenacious adhesion to the spheroidal particles. The stream with reduced salt solids is removed to a subsequent utilization. The spheroidal particles are periodically cleaned in the absence of the electric field of the accumulated salt solids with a non-aqueous wash liquid for restoring the efficiency of the bed to remove further quantities of salt solids from the stream under the influence of the electric field. In another aspect of the present process, salt solids are obtained from the particle cleaning in a substantial anhydrous form for ready disposal."

U.S. Pat. No. 3,799,857 relates to "an electrofilter system for removing solids from an organic liquid. The system comprises a vessel with an upright flow axis, inlet and outlet means for passing the organic liquid through a particulate bed residing in the vessel. The bed is formed of hard-granular, spheroidal particles of substantial uniformity in size and of a rigid and substantially incompressible dielectric material. The vessel has a void region above the bed to permit a substantial vertical expansion of the particles. An electric field within the bed has an intensity sufficient for removing solids from the organic liquid by their adhesion to the particles. The particles are periodically cleaned of adhering solids by means providing for (1) interruption of the electric fields, (2) expansion of the particles into the void region, and (3) induction of particles into a circular movement relative to one another, and then (4) removal of the released solids from the vessel."

U.S. Pat. No. 3,928,158 relates to "A method and apparatus for removing electrically conductive suspended contaminants from high resistivity oils free of significant amounts of dispersed water by flowing the oil through the interstitial spaces defined with a mass of substantially spherical ceramic beads of high electrical resistivity and wherein a high gradient electrostatic field is maintained across the mass."

In U.S. Pat. Nos. 3,799,855, 3,799,856, 3,799,857 the dielectric material employed is described as follows:

"The electrofilter contains a porous bed which is comprised of a plurality of hard granular, spheroidal particles. These particles should be of a hard granular material which is substantially uniform in size. The term "spheroidal" is intended to include round, and oval and other non-rounded particles having minor to major axes in ratios not exceeding 4 to 6. By the term 'uniform in size' is meant particles whose size distribution is not greater than two to one in average maximum dimension. In addition, these speroidal particles should be rigid and of a substantially incompressible dielectric material. By 'dielectric material,' is meant a material having a relatively high electrical resistivity and a small dielectric constant approaching that of the hydrocarbon stream to be treated. The dielectric material, for best results, should have a dielectric constant generally below 8, and preferably, a constant in the range of about 5 to 7. Stated in another manner, the particles should be of a dielectric material having a relatively high electrical resistivity in comparison to water. The dielectric properties of the spheroidal particles provide a surface for efficient retention of the extracted solids in response to an electric field established within the electrofilter. Moreover, the surface of these particles provide for the ready release of the accumulated solids upon agitation of these particles (without the electric field) with a suitable wash liquid.

"Any suitable solid dielectric material may be employed which has a sufficient compressive strength to resist being crushed in the bed. For example, blast furnace slag from steel mills having a range of particle sizes between one-eighth and one-half inches (in maximum dimension) may be employed. Similarly, a screened river gravel having dimensions between one-quarter and one-half inch sizes (in maximum dimension) may be employed. It is preferred to employ a spheroidal particle bed which has approximately between 30 and 40 percent voids. It has been found that such beds operate very efficiently in removal of solids from hydrocarbon streams in the present process.

"Preferably the spheroidal particles are selected from glass beads having about a one-quarter diameter. In particular, the one-quarter inch diameter glass beads which are employed for propping subterranean formations during oil well stimulation techniques have been found to be very useful in the present process. These beads are specially prepared for use in propping subterranean formations during hydrofacing techniques because of exceptional physical characteristics. These special physical characteristics are provided by the rapid chilling of molten glass during the manufacture of these beads. This rapid chilling procedure forms a very tough, hard and smooth skin about the glass particles. These particles have a compressive strength greatly in excess of 50,000 p.s.i. and a tensile strength above approximately 8,000 p.s.i. They are a commercial article readily obtained from the Halliburton Company of Duncan, Okla. Since the 'skin' about these beads is very smooth, the adhering solids (without the electric field) can be completely removed by proper use of a wash liquid. The skin is also very hard to resist scratching and the resultant reduction in the very high electrical resistance of each particle."

The media employed in U.S. Pat. No. 3,928,158 are described as follows:

"Glass is a preferred material for the beads used in this filter. Beads of glass are readily available as commercial products having resistivities from about $1\times10^{9}$ ohm-cm for soda lime glass up to about $1\times10^{15}$ ohm-cm. Other ceramic products also have the necessary high resistivity. For example, beads of mullite, which has a resistivity of approximately $1\times10^{14}$ ohm-cm, also can be used. The high electrical resistivity of the beads is essential but is only one of the characteristics of the beads that must be met.

"The material suitable for the filter media in accordance with our invention, in addition to having a high electrical resistivity, must also be substantially smooth and substantially nondeformable. By substantially smooth, we do not mean that the surface of the individual particles of the media cannot have any surface irregularities whatsoever but rather that the surface areas of such particles are not substantially greater than the theoretical surface area attributable to their substantially spherical shape. Thus, for example, assuming the surface irregularities are to be circular indentations, we consider any surface wherein the depth of the indentations is less than their diameter to be substantially smooth. We prefer, however, to employ materials wherein the depth of the indentations is less than $\frac{3}{4}$ of the diameter and even less than $\frac{1}{2}$ of the diameter. In the situation of more linear irregularities in the surface, such as, what might be described as a surface "scratch," the depth of such scratch is not to exceed the width of the scratch measured at its narrowest point. Similarly, we prefer to employ materials wherein the depth of the surface irregularities is less than $\frac{3}{4}$ and even less than $\frac{1}{2}$ the width of such irregularity. Thus, it will be seen that the media employed in our invention can be described as comprising a bed of particles having a smooth surface as distinguished from a rough surface such as would be possessed by highly porous catalyst carriers having surface areas ranging up to several hundred square meters per gram. Illustrative of substantially spherical glass beads suitable for employment as a filter media of our invention are high strength glass beads or pellets of the type employed as a propping agent in the field of oil well production. One such glass propping agent is commercially available under the tradename of UCAR Props.

"The importance of a smooth outer surface was illustrated by tests on an electrofilter in which the filter medium was mullite beads of the type used in ball mills for grinding paint pigments. Although the surface appeared to be smooth, examination under a microscope showed the surface to be rough. The filter was quickly shorted and could not be cleaned by backflushing. In contrast, mullite beads treated to have a smooth surface gave runs of satisfactory length and could be cleaned by backflushing. Crazing in the surface of porcelain beads may cause sufficient roughness to prevent their effective use. It is believed that the effect of a rough surface is not only that such a surface provides sheltered niches in which contaminants can be lodged, but also surface irregularities are believed to cause a non-uniform electrostatic field on the surface of the beads and the non-uniform field encourages the accumulation of solids over the surface of the beads other than at points of contact between adjacent beads.

"The beads may range in size from a minimum of 1/32 inch in diameter to a maximum of about $\frac{1}{4}$ inch in diameter. Particles as small as 1/32 inch in diameter can be used when the liquid to be filtered has a low viscosity and the rate of flow through the filter is low. Otherwise, the pressure drop through the bed of beads may be excessive. Beads having a diameter larger than $\frac{1}{4}$ inch are not as effective in removing solid particles from the nonconductive liquid being filtered and require high backflushing flow rates for effective cleaning. Beads having a diameter of approximately $\frac{1}{8}$ inch have been found to be particularly advantageous in the electrostatic filtration of liquids ranging in properties from those of light gas oils to those of reduced crudes.

"The individual particles of the media employed in our invention are also to be substantially non-deformable. By non-deformable is meant that there is no appreciable distortion in configuration of the particles under the loads normally encountered in the processing herein. The characteristic is important since it is not desired to increase contact area between the adjacent particles in the media or between the electrode surface and the particles in the media. In this connection, it should be noted that it had been proposed in electrofilter art to employ highly porous and deformable media which are spongelike in nature, whereby, through the deformation of the media, greater surface contact by the media and electrodes, particularly plate electrodes, is effected and also a certain reduction of the aize of the pores passing through the media is effected. Our substantially non-deformable media is not of this latter type."

Although the examples of this invention have described the regeneration of media in electrofiltration systems wherein nickel has been employed as a catalyst in food systems, it can also be employed in other systems, including food, as well as non-food, systems, where nickel is employed. In addition, it can also be employed to regenerate media for both food and non-food systems where other materials susceptible to the treatment can be employed, for example, where other metal catalysts are employed such as aluminum, etc.

In summary, the present system can be employed in the regeneration of media, of all types, employed in electrofiltration, in all systems, both food and non-food, where metals, of all types, are deposited on the media, provided the metal deposit is capable of being removed by such treatment.

I claim:

1. An electrofiltration process for removing hydrogenation catalyst and other undissolved solids from a stream of edible oil which has been subjected to catalytic hydrogenation, said process comprising:

a. providing the stream of so hydrogenated edible oil at a sufficient temperature that organic solids such as stearine are in solution and cannot plug an electrofilter bed adapted to remove the undissolved solids carried therein;

b. passing said stream of oil through a chemically inert bed having multitudinous flow channels between rigid masses of a solid material having a dielectric constant not in excess of about 7;

c. establishing a d.c. electrical field within said bed having an intensity sufficient for removing the undissolved solids from said stream of oil by electrically induced adhesion of the solids in said bed material;

d. removing the purified oil stream with reduced undissolved solids content from said bed; and e. cleaning at selected intervals at least a portion of said material of adhering solids by interruption of said electrical field, passing a cleaning fluid to remove adhering solids from said material and removing the fluid with the removed solids from said material;

which is further characterized by f. periodically washing said material with an acid so as to regenerate its activity.

2. The process of claim 1 where said bed material comprises particles of a mineral containing crystalline silicon dioxide, said mineral having a hardness value of at least 7 on the Mohs scale of hardness, a specific gravity of about 2.5 to about 2.9, a dielectric constant of about 4 and a discontinuous surface configuration provided by nature.

3. The process of claim 1 where said bed material comprises particles of crushed flint.

4. The process of claim 1 where said bed material comprises spheroidal particles.

5. The process of claim 4 where said bed material comprises glass or ceramic beads.

6. The process of claim 1 where said bed material comprises particles of crushed flint with an average particle size of about 2.5 mm.

7. The process of claim 1 where said acid is a mineral acid.

8. The process of claim 1 where said acid is phosphoric acid.

9. The process of claim 8 where said edible oil is soybean oil and said phosphoric acid is incorporated in soybean oil during treating step (f).

10. The process of regenerating the activity of an inert electrofiltration media consisting of a chemically inert bed having multitudinous flow channels between rigid masses of a solid material having a dielectric constant not in excess of about 7, said media having been employed in the electrofiltration of a nickel containing organic fluid, said process comprising washing said media with an acid.

11. The process of claim 10 where said acid is a mineral acid.

12. The process of claim 10 where said acid is phosphoric acid.

13. The process of claim 10 where said bed material comprises particles of a mineral containing crystalline silicon dioxide, said mineral having a hardness value of at least 7 on the Mohs scale of hardness, a specific gravity of about 2.5 to about 2.9, a dielectric constant of about 4 and a discontinuous surface configuration provided by nature.

14. The process of claim 10 where said bed material comprises particles of crushed flint.

15. The process of claim 10 where said bed material comprises spheroidal particles.

16. The process of claim 10 where said bed material comprises glass or ceramic beads.

17. The process of claim 10 where said bed material comprises particles of crushed flint with an average particle size of about 2.5 mm.

18. The process of claim 10 where said metal containing organic fluid is an edible oil which has been subjected to hydrogenation in the presence of a nickel catalyst.

19. The process of claim 18 where said edible oil is soybean oil, said mineral acid is phosphoric acid and said phosphoric acid is incorporated in hydrogenated soybean oil during said washing.

* * * * *